United States Patent [19]
Croft et al.

[11] Patent Number: 5,864,708
[45] Date of Patent: Jan. 26, 1999

[54] DOCKING STATION FOR DOCKING A PORTABLE COMPUTER WITH A WIRELESS INTERFACE

[76] Inventors: Daniel I. Croft, 39107 Kings Valley Hwy., Monmouth, Oreg. 97361; Gregory J. May, 4115 NE. Morning St., Corvallis, Oreg. 97330; Randy W. Hergett, 2150 Primrose Loop, Philomath, Pa. 97370; Charles S. Stephens, 1440 NW. Skipanon Dr., Corvalis, Oreg. 97330

[21] Appl. No.: 650,668

[22] Filed: May 20, 1996

[51] Int. Cl.$^6$ ............................................. G06F 13/00
[52] U.S. Cl. ............... 395/821; 395/892; 395/882; 395/500; 395/281; 370/521; 359/152
[58] Field of Search ............... 395/283, 825, 395/282, 821–892, 500; 370/821; 389/152–164

[56] References Cited

U.S. PATENT DOCUMENTS

| | | | |
|---|---|---|---|
| 4,734,874 | 3/1988 | Hwang et al. | 364/708 |
| 5,127,050 | 6/1992 | Takahashi et al. | 379/428 |
| 5,142,446 | 8/1992 | Tanaka et al. | 361/393 |
| 5,209,583 | 5/1993 | Lewis et al. | 400/88 |
| 5,227,953 | 7/1993 | Lindberg et al. | 361/393 |
| 5,237,663 | 8/1993 | Srinivasan | 395/325 |
| 5,245,169 | 9/1993 | Nakano | 235/486 |
| 5,283,714 | 2/1994 | Tsai et al. | 361/683 |
| 5,375,226 | 12/1994 | Sano et al. | 395/500 |
| 5,430,567 | 7/1995 | Shaw et al. | 359/107 |
| 5,465,038 | 11/1995 | Register | 320/2 |
| 5,493,542 | 2/1996 | Odelid | 368/10 |
| 5,546,211 | 8/1996 | Devon | 395/154 |
| 5,559,501 | 9/1996 | Barzegar et al. | 340/825 |
| 5,561,446 | 10/1996 | Montlick | 345/177 |
| 5,598,539 | 1/1997 | Gephardt et al. | 395/281 |
| 5,600,471 | 2/1997 | Hirohashi et al. | 359/152 |
| 5,617,236 | 4/1997 | Want et al. | 359/172 |
| 5,628,055 | 5/1997 | Stein | 455/89 |
| 5,632,020 | 5/1997 | Gephardt et al. | 395/283 |
| 5,668,566 | 9/1997 | Yen | 345/2 |
| 5,668,977 | 9/1997 | Swanstrom et al. | 395/500 |
| 5,675,524 | 10/1997 | Bernard | 364/705.05 |
| 5,682,379 | 10/1997 | Mahany et al. | 370/311 |
| 5,687,717 | 11/1997 | Halpern et al. | 128/630 |
| 5,699,226 | 12/1997 | Cavello | 361/686 |
| 5,701,302 | 12/1997 | Geiger | 370/521 |
| 5,724,168 | 3/1998 | Oschmann et al. | 359/172 |
| 5,794,164 | 8/1998 | Beckert et al. | 701/1 |

*Primary Examiner*—Christopher B. Shin

[57] ABSTRACT

A docking station for a portable computer includes a wireless transceiver for wireless communication with the portable computer. The docking station also includes a plurality of ports. Each port includes a physical connector for connection to, for example, one or more peripheral devices, a network or a monitor. A translation manager within the docking station manages translation of information transferred between the wireless transceiver and the plurality of ports.

31 Claims, 12 Drawing Sheets

DOCKING STATION FOR DOCKING A PORTABLE COMPUTER WITH A WIRELESS INTERFACE

BACKGROUND

The present invention concerns docking stations for portable computers.

Generally a portable computer, such as a notebook computer, a laptop computer or a palm top computer, is optimized to reduce size and weight. This often requires tradeoffs, for example, in the size of the display and keyboard, as well as the number and types of ports which are implemented.

One way to increase the versatility of portable computers is to provide for a docking station. The docking station when connected to a portable computer provides for a number of different types of ports. These ports are used, for example, to drive a large monitor, communicate with various peripherals provide connection to a network, and so on. See for example, U.S. Pat. No. 5,283,714 issued to Collins Tsai, et al, for "Docking Apparatus for a Portable Computer."

The docking station may reside in a permanent location with ports connected to various devices. When "at the office" a user can take advantage of the power of a full desktop computer by connecting the portable computer to the docking station. When "on the road" the user has the advantage of a light weight and small sized personal computer.

Docking stations, while useful, have several significant drawbacks. For example, they are generally bulky mechanical devices that consume desktop space. They require costly mechanical and electrical interconnects. They are difficult to develop electrically due to electromagnetic compatibility (EMC) requirements beyond the requirements of portable computers. In addition, each time there is a change in the physical dimensions of a successive generation of portable computers, it is generally necessary to utilize a new docking station which is designed specifically to interact with the new generation of portable computers.

SUMMARY OF THE INVENTION

In accordance with the preferred embodiment of the present invention, a docking station for a portable computer is presented. The portable computer is, for example, a notebook computer, a laptop computer or a palm top computer. The docking station includes a wireless transceiver for wireless communication with the portable computer. The docking station also includes a plurality of ports. Each port includes a physical connector for connection to, for example, one or more peripheral devices, a network or a monitor. A translation manager within the docking station manages translation of information transferred between the wireless transceiver and the plurality of ports.

The translation manager includes, for example, a protocol manager and a port generator. The protocol manager extracts data intended for the plurality of ports from wireless communication received by the wireless transceiver. The port generator generates control and data signals for the plurality of ports from the data extracted by the protocol manager.

For example, in one embodiment of the present invention, the docking station includes a port for an input/output bus interface. The translation manager includes a bus generator which generates control and data signals for the input/output bus interface.

In various embodiments of the present invention, the wireless transceiver transmits and receives infrared signals. Alternatively, other media may be used such as optical fibers, radio signals or some other wireless media.

The wireless communication may be established between the docking station and the portable computer in a variety of ways. For example, an optical cable may be used to connect the docking station to the portable computer. Alternatively, the docking station may include a flat pad on which is placed the portable computer. In one embodiment, the flat pad includes both an infrared transceiver and a low profile inductor. The low profile inductor is used to provide power to the portable computer.

In order to facilitate wireless communication with the docking station, the portable computer includes, for example a virtual port generating process which communicates with the operating system programs and application programs executing on the personal computer through a plurality of virtual ports. A translation manager on the portable computer manages translation of information transferred between a wireless transceiver and the plurality of virtual ports.

The present invention allows for efficient connection between a portable computer and a docking station. Mechanical connection parts are minimized or eliminated, depending upon the selected embodiment. The present invention significantly reduces the EMC issues in designing a docking station. It is anticipated the present invention will allow for a longer life cycle for docking stations as it will not be necessary to develop a new docking station every time the shape of a personal computer is changed. Additionally, because of the simplified connection scheme, personal computers of a variety of shapes and sizes can utilize a single docking station.

DESCRIPTION OF THE PREFERRED EMBODIMENT

Figure 1:
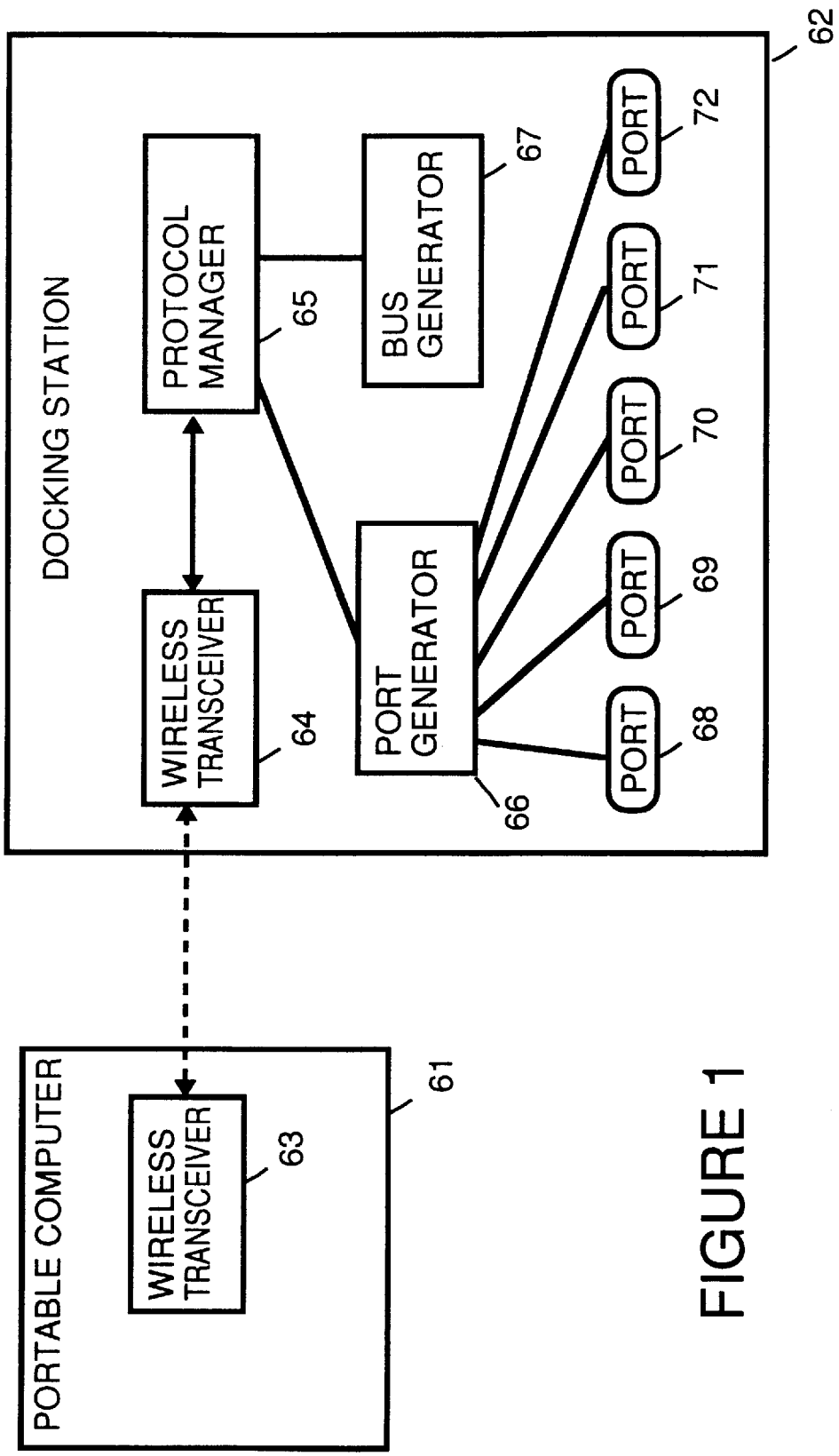
FIG. 1 shows a block diagram for a docking station which provides for wireless communication with a portable computer in accordance with the preferred embodiment of the present invention.

FIG. 1 shows a block diagram of a docking station 62 which provides for wireless communication with a portable computer 61. A wireless transceiver 63 within portable computer 61 communicates with a wireless transceiver 64 within docking station 62. For example, communication is done using an Infrared Data Association (IrDA) standard infrared data link or some other protocol for optical communication. Alternate to optical transmission, other transmission media may be used. For example, radio frequency transmissions or other wireless transmission technology may be used in place of optical transmission.

Within docking station 62, wireless transceiver 64 communicates with a protocol manager 65. Protocol manager 65 extracts information received from wireless transceiver 64 and separates information intended for different ports/busses. Information intended for various ports are forwarded to port generator 66. Port generator 66 generates control signals and data signals for a port 68, a port 69, a port 70, a port 71 and a port 72. Ports 68 through 72 are illustrative and may include, for example, one or more serial ports, parallel ports, PS/2 ports, universal serial bus (USB) ports, or some other combination of standard or non-standard ports used in conjunction with a personal computer.

Information from wireless transceiver 64 intended for an input/output (I/O) bus are forwarded to a bus generator 67. Bus generator 67 generates control signals and data signals for an input/output (I/O) bus. The I/O bus may operate, for example, in accordance with a SCSI protocol, a PCI protocol or some other standard or non-standard I/O bus protocol.

Port generator 66 also receives control signals and data signals from port 68, port 69, port 70, port 71 and port 72 and forwards these to protocol manager 65. Likewise, bus generator 67 receives control signals and data signals from the I/O bus and forwards these to protocol manager 65. Protocol manager 65 combines the received information into the selected wireless communication protocol and forwards the resulting data to wireless transceiver 64 for transmission to portable computer 61.

Figure 2:
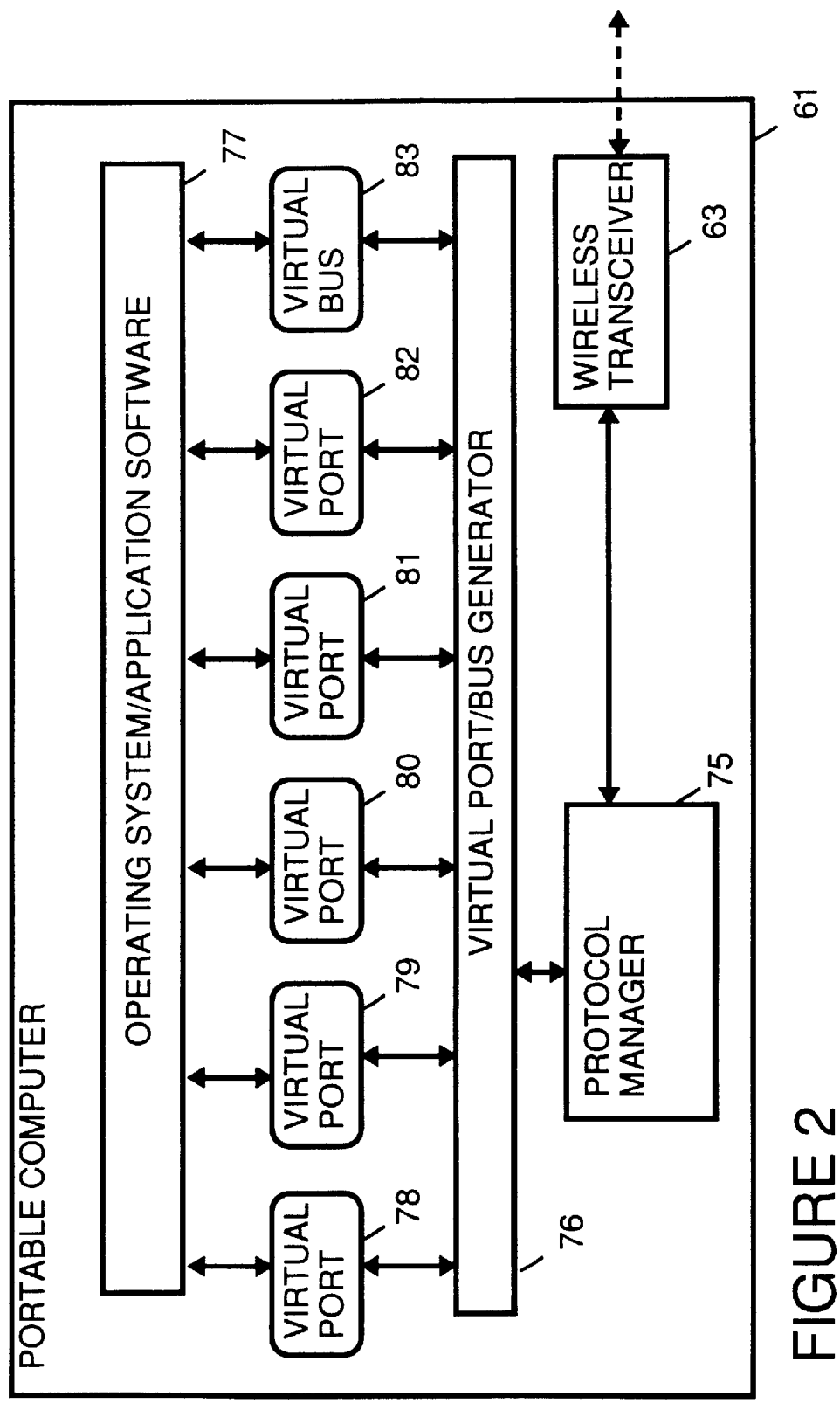
FIG. 2 is a block diagram of components within the portable computer shown in FIG. 1 which implement wireless communication with the docking station also shown in FIG. 1 in accordance with the preferred embodiment of the present invention.

FIG. 2 shows components within portable computer 61 which implement wireless communication with docking station 62. Operating system and application software 77, executing on hardware within portable computer 61, read data from and write data to various virtual ports and/or I/O buses. These are represented in FIG. 2 by a virtual port 78, a virtual port 79, a virtual port 80, a virtual port 81, a virtual port 82 and a virtual bus 83. A virtual port/generator 76 receives control signals and data signals from virtual port 78, virtual port 79, virtual port 80, virtual port 81, virtual port 82 and virtual bus 83 and forwards these to a protocol manager 75. Protocol manager 75 combines information into the selected wireless communication protocol and forwards the resulting data to wireless transceiver 63 for transmission to docking station 62.

For information received from docking station 62, protocol manager 75 extracts information received at wireless transceiver 63 and separates information intended for different virtual ports/busses. Virtual port/bus generator 76 generates data for virtual port 78, virtual port 79, virtual port 80, virtual port 81, virtual port 82 and virtual bus 83. The data sent to virtual port 78, virtual port 79, virtual port 80, virtual port 81, virtual port 82 and virtual bus 83 is then utilized by operating system and application software 77.

Figure 3:
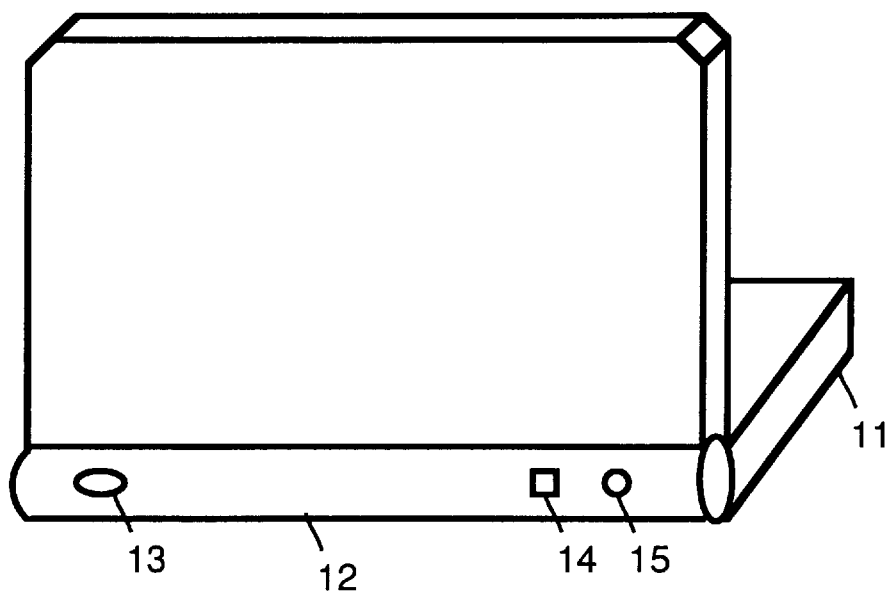
FIG. 3 shows a wireless communication port which allows wireless communication with a docking station in accordance with a preferred embodiment of the present invention.

FIGS. 3 through 7 illustrate various physical implementations of systems which utilize wireless communication between a portable computer and a docking station. For example, FIG. 3 shows a portable computer 11 which includes an infrared communication port 13 on a back panel 12. Back panel 12 may include other ports usable by portable computer 11 when portable computer 12 is not connected to a docking station. For example, a telephone port 14 is shown in FIG. 3. A power jack 15 is also shown.

Figure 4:
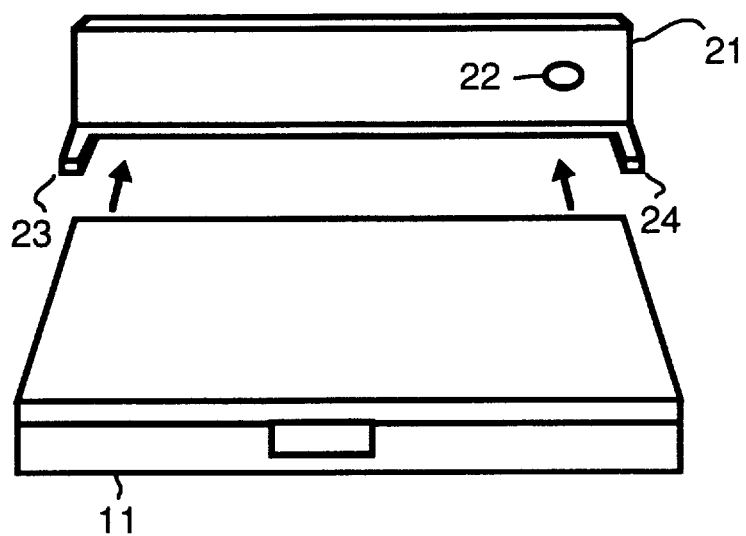
FIG. 4 and FIG. 5 show a docking station and a portable computer being placed for wireless communication in accordance with a preferred embodiment of the present invention.

As shown in FIG. 4, portable computer 11 may be placed next to a docking station 21 in order to establish communication between portable computer 11 and docking station 21. A guide 23 and a guide 24 are situated so that infrared communication port 13 on back panel 12 (shown in FIG. 3) of portable computer 11 is lined up with infrared communication port 22 of docking station 21. Optionally guides 23 and 24 can be omitted.

Figure 5:
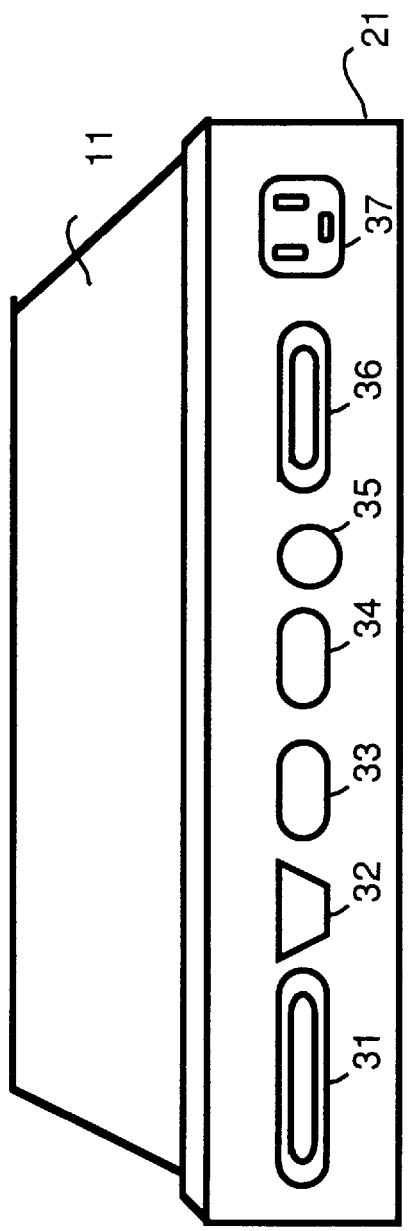

FIG. 5 shows a back side of docking station 21 which includes, for various ports, a physical connector 31, a physical connector 32, a physical connector 33, a physical connector 34, a physical connector 35 and a physical connector 36. A physical connector 37 for power is also shown.

Figure 6:
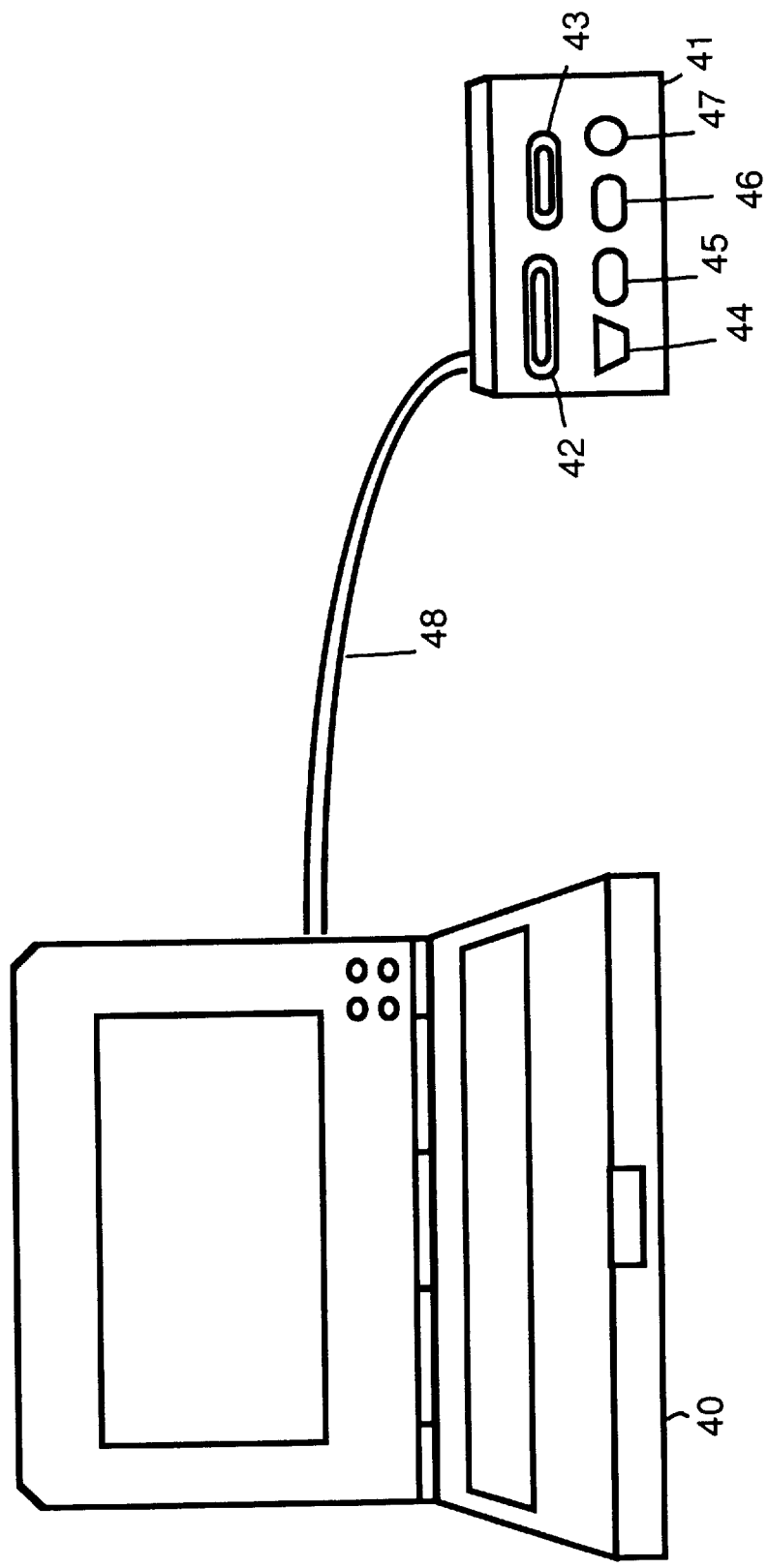
FIG. 6 shows a docking station and a portable computer communicating using an optical fiber in accordance with an alternate preferred embodiment of the present invention.

FIG. 6 shows another embodiment in which a portable computer 40 is connected to a docking station 41 by a cable 48. Cable 48 includes for example optical fibers. In addition, cable 48 may include a power line (DC or AC). Cable 48 connects to a single connect point on portable computer 40. Docking station 41 includes, for various ports, a physical connector 42, a physical connector 43, a physical connector 44, a physical connector 45, a physical connector 46 and a physical connector 47.

Figure 7:
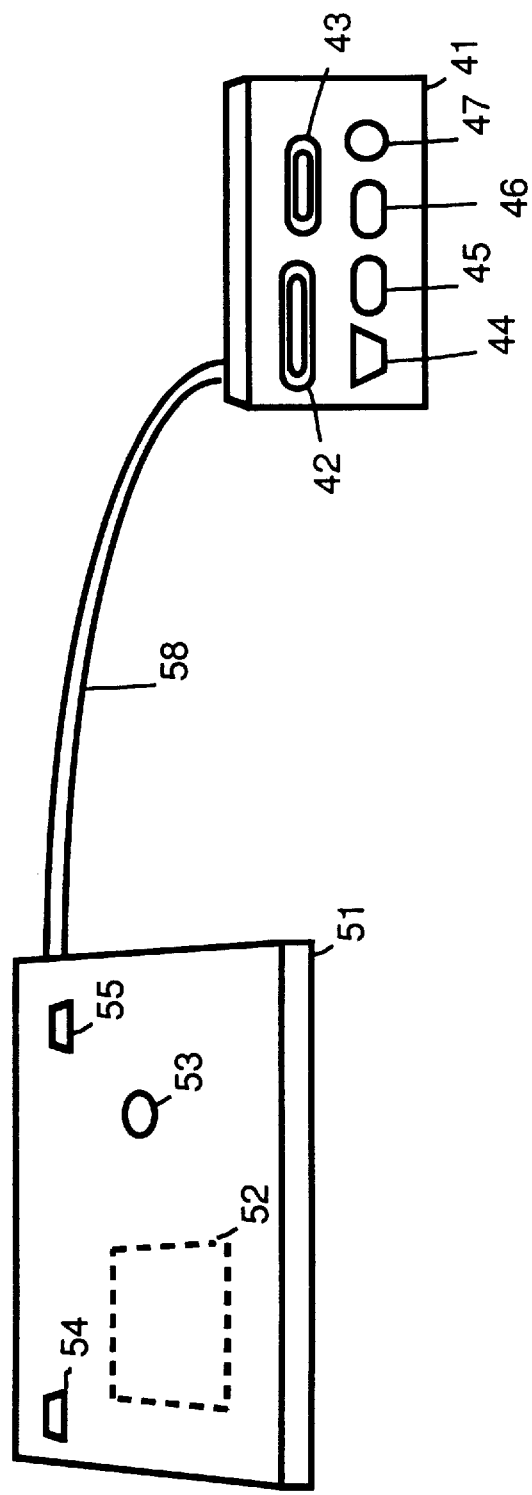
FIG. 7 shows a docking station and a portable computer communicating using wireless communication and an optical fiber in accordance with another alternate preferred embodiment of the present invention.

Alternative to use of a physical connector, there are other ways portable computer 40 may be connected to docking station 41. For example, FIG. 7 shows a flat pad 51 which may be placed beneath portable computer 40. Power is inductively coupled to portable computer 40 via a low profile inductor 52 within flat pad 51. Wireless contact is achieved via an infrared transceiver 53 in flat pad 51. This requires that an infrared transceiver be appropriately placed in the bottom of portable computer 40 or near back edge of flat pad 51. Physical alignment is achieved using alignment indentations 54 and 55 within flat pad 51.

Optionally, infrared transceiver 53 may include a large enough array of optical fibers so that a communication link may be established between flat pad 51 and portable computer 40 for a large alignment range. This is done, for example, by spreading the fibers at flat pad 51 into a wide pattern. Alternatively, if desired, logical alignment could be used over the large alignment range. Logical alignment is accomplished, for example, by interrogating the array of receiving fibers in infrared transceiver 53 to determine which receptors are receiving transmission from portable computer 40. This would determine which transmitting and receiving fibers are used by infrared transceiver 53 to communicate with portable computer 40.

An alternate embodiment has been contemplated where portable computer 11 is not placed next to docking station 21, but instead is a fixed or variable distance away from docking station 21. This fixed or variable distance normally provides for portable computer 11 and docking station 21 to be from several inches to several feet away from each other. If distances at the high end of this range are desirable, radio frequency transmission technology will be preferred over infrared transmission technology. An example of use of this alternate embodiment is in a typical office or cubicle, where the user has a docking station tucked out of the way in the rear corner of his desk (or even under his desk), where the docking station is communicating with a portable computer a few feet away on the front of the user's desk.

Alternatively, flat pad 51 may be connected to portable computer 40 through an optical cable as described above.

In one embodiment of the present invention, security is accomplished by sounding an alarm or transmitting a security breach signal to a remote receiver when portable computer 40 is removed from flat pad 51.

Also, in another alternate embodiment, flat pad 51 is actually built into a work surface. Communication is established between portable computer 40 and flat pad 51 by placement of portable computer 40 on the work station at the location of flat pad 51.

As shown in FIG. 7, flat pad 51 is connected to docking station 41 by a cable 58. Cable 58 includes for example optical fibers. In addition, cable 58 may include a power line (DC). Physical connectors 42–47 for various ports are included in docking station 41. Alternatively, docking station 41 may be implemented within flat pad 51 so that the physical connections for the various ports are placed at, for example, a rear end of flat pad 51.

Figure 8:
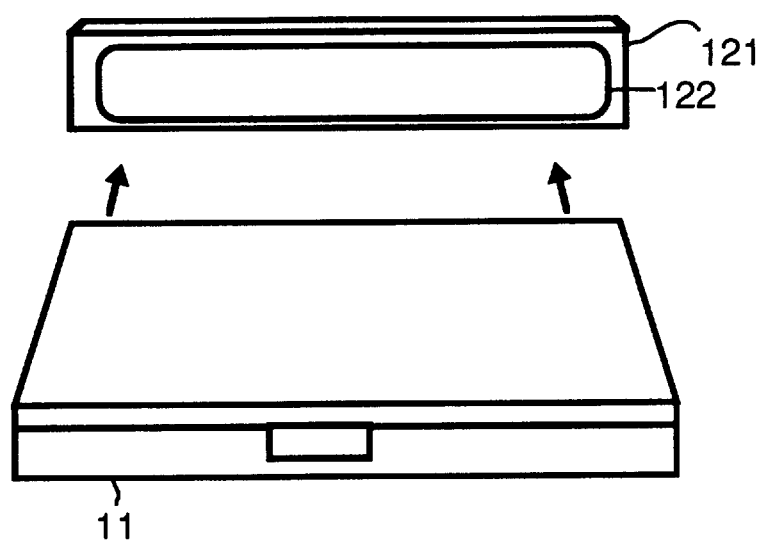
FIG. 8 and FIG. 9 show a docking station used for wireless communication in accordance with an alternative preferred embodiment of the present invention.

FIG. 8 shows a docking station 121 for portable computer 11. Portable computer 11 may be placed next to a docking station 121 in order to establish communication between portable computer 11 and docking station 121. As long as infrared communication port 13 on back panel 12 (shown in FIG. 3) of portable computer 11 is lined up somewhere within window 122 of docking station 121 communication can be established between portable computer 11 and docking station 121.

An alternate embodiment has been contemplated where portable computer 11 is not placed next to docking station 21, but instead is a fixed or variable distance away from docking station 21. This fixed or variable distance normally provides for portable computer 11 and docking station 21 to be from several inches to several feet away from each other. If distances at the high end of this range are desirable, radio frequency transmission technology will be preferred over infrared transmission technology. An example of use of this alternate embodiment is in a typical office or cubicle, where the user has a docking station tucked out of the way in the rear corner of his desk (or even under his desk), where the docking station is communicating with a portable computer a few feet away on the front of the user's desk.

Figure 9:
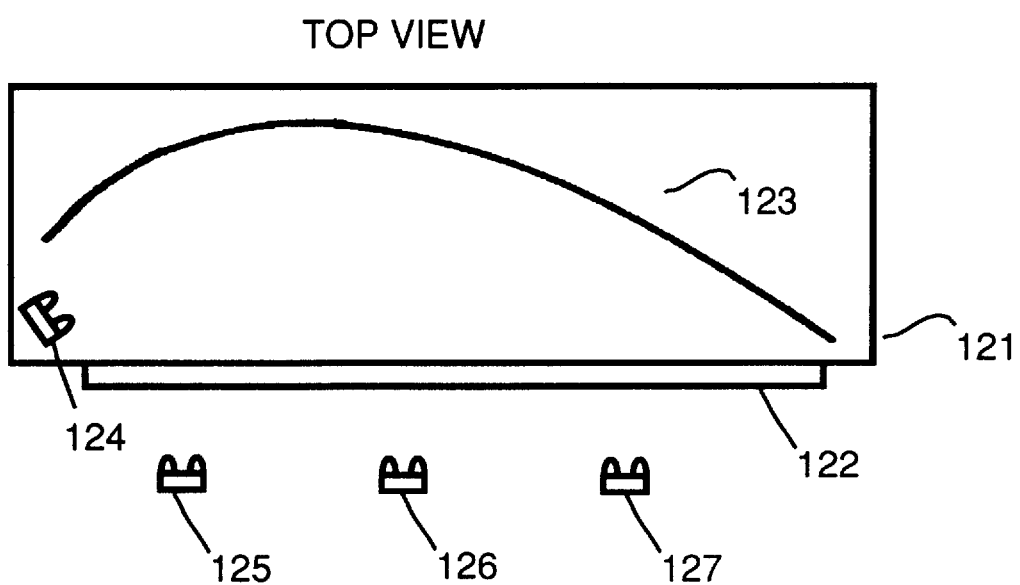

FIG. 9 shows a top view of pertinent features inside docking station 121. A reflective surface 123 of docking station 121 is shaped and positioned to allow outgoing IR signals from an IR transceiver 124 to be reflected out of window 122. For example, reflective surface 123 is parabolically shaped. Reflective surface 123 also reflects incoming signals through window 122 to IR transceiver 124. Icons 125, 126 and 127 represent various positions into which infrared communication port 13 on back panel 12 (shown in FIG. 3) of portable computer 11 may be aligned in order to allow for the establishment of communication between portable computer 11 and docking station 121.

The large size of window 122 allows docking station 121 to work with various units where the IR port is physically located at different locations. This also allows different versions of different products where the location of an IR port is moved to continue to be compatible with docking station 121. Also, as is clear, the large size of window 122 assures that alignment of docking station 121 to portable computer 11 in order to establish communication.

Figure 10:
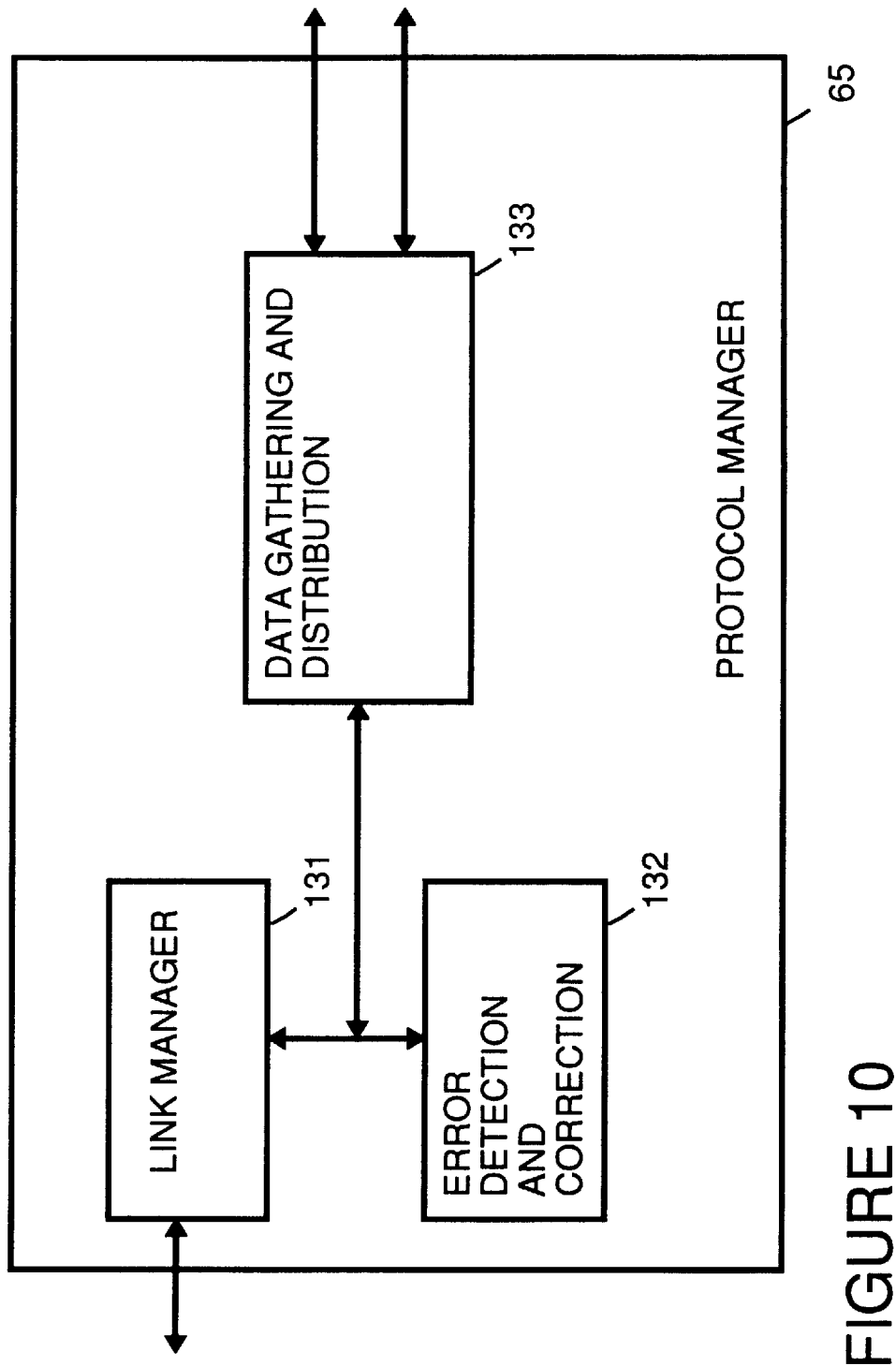
FIG. 10 is a simplified block diagram of a protocol manager in accordance with a preferred embodiment of the present invention.

FIG. 10 is a simplified block diagram of protocol manager 65. Protocol manager includes a link manager 131. Link manager 131 performs all of the tasks associated with the communication link between wireless transceiver 64 and wireless transceiver 63 (wireless transceiver 64 and wireless transceiver 63 are shown in FIG. 1). Link manager 131 controls how devices are identified, how connections are set up between wireless transceivers and how disconnect is handled gracefully.

Error detection and correction block 132 monitors data traveling to and from wireless transceiver 64 verifying the integrity of the data and when appropriate requesting a re-transmission of the data. This includes, for example appending additional checksums or other correction bytes to data packets that traverse the link between wireless transceiver 63 and wireless transceiver 64 so that the protocol manager for the unit receiving can detect if a transmission error has occurred.

Data gathering and distribution block 133 is responsible for distributing data received by wireless transceiver 64 to the various ports, and for assembling data gathered from various ports for transmission by wireless transceiver 64.

Figure 11:
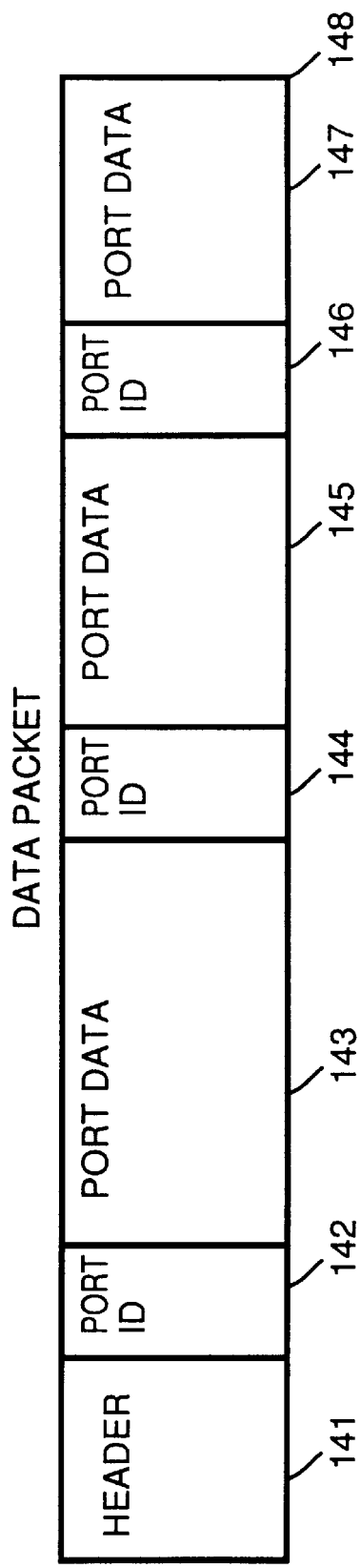
FIG. 11 is a simplified block diagram of a packet in accordance with a preferred embodiment of the present invention.

FIG. 11 is a simplified block diagram of a data packet 148 transmitted between wireless transceiver 63 and wireless transceiver 64. A header 141 includes a checksum and other packet identification information. A port identification number 142 specifies the port type, data length and additional information pertaining to port data 143. A port identification number 144 specifies the port type, data length and additional information pertaining to port data 145. A port identification number 146 specifies the port type, data length and additional information pertaining to port data 147.

Figure 12:
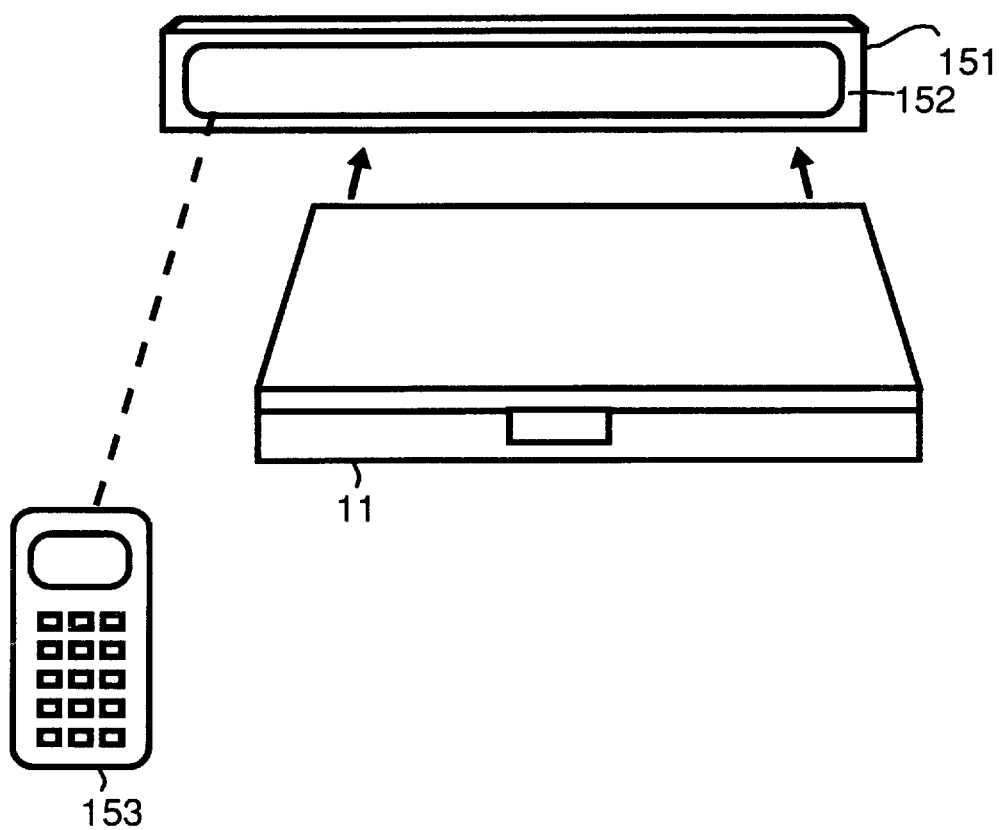
FIG. 12 shows a docking station used for wireless communication in accordance with another alternative preferred embodiment of the present invention.

FIG. 12 shows a docking station 151 for portable computer 11. Portable computer 11 may be placed next to a docking station 151 in order to establish communication between portable computer 11 and docking station 151. As long as infrared communication port 13 on back panel 15 (shown in FIG. 3) of portable computer 11 is lined up somewhere within window 152 of docking station 151 communication can be established between portable computer 11 and docking station 151.

An alternate embodiment has been contemplated where portable computer 11 is not placed next to docking station 21, but instead is a fixed or variable distance away from docking station 21. This fixed or variable distance normally provides for portable computer 11 and docking station 21 to be from several inches to several feet away from each other. If distances at the high end of this range are desirable, radio frequency transmission technology will be preferred over infrared transmission technology. An example of use of this alternate embodiment is in a typical office or cubicle, where the user has a docking station tucked out of the way in the rear corner of his desk (or even under his desk), where the docking station is communicating with a portable computer a few feet away on the front of the user's desk.

As may be seen from FIG. 12, window 152 extends to an area wider than back panel 15 of portable computer 11. This allows docking station 151 to capture and reflect IR signals from a source other than portable computer 11, even when portable computer 11 is docked with docking station 151. This allows docking station 151 to interact with other devices, for example, a handheld controller or other device, even when portable computer 11 is docked to docking station 151. For example, shows a handheld device 153 able to communicate with docking station 151 even when portable computer 11 is docked to docking station 151.

In addition, the extended window 152 enhances and extends the use of the IR port capabilities of portable computer 11 since IR information forwarded to docking station 151 by other devices can be forwarded by docking station 151 to portable computer 11. This allows for portable computer 11 to have IR communication capability with external devices, such as printers, handheld controllers and so on even when portable computer 11 is docked to docking station 151. Further, this IR communication capability is available without the necessity of adding an additional IR port to the front of portable computer 11.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A portable computing system comprising:
    a portable computer including:
        program execution hardware which executes an operating system program and application programs,
        a virtual port generating process which communicates with the operating system program and application program through a plurality of virtual ports,
        a first wireless transceiver, and
        a first translation manager, coupled between the first wireless transceiver and the virtual port generating process, for managing translation of information transferred between the first wireless transceiver and the plurality of virtual ports, wherein the translation managed by the translation manager allows all information passing through the plurality of virtual ports to be communicated using the wireless transceiver.

2. A portable computing system as in claim 1 wherein the first wireless transceiver transmits and receives infrared signals.

3. A portable computing system as in claim 1 wherein the first translation manager includes:
    a first protocol manager coupled to the first wireless transceiver, the first protocol manager extracting different information intended for the plurality of virtual ports from wireless communication received by the first wireless transceiver.

4. A portable computing system as in claim 1, additionally comprising:
    a docking station including:
        a second wireless transceiver for wireless communication with the portable computer,
        a plurality of ports, each port including a physical connector, and
        a second translation manager, coupled between the second wireless transceiver and the plurality of ports, for managing translation of information transferred between the second wireless transceiver and the plurality of ports.

5. A portable computing system as in claim 4 wherein the second wireless transceiver transmits and receives infrared signals.

6. A portable computing system as in claim 4 wherein the second translation manager includes:
    a second protocol manager coupled to the second wireless transceiver, the second protocol manager extracting different information intended for the plurality of ports from wireless communication received by the second wireless transceiver; and,
    a port generator coupled to the plurality of ports and to the second protocol manager, the port generator generating control and data signals for the plurality of ports.

7. A portable computing system as in claim 6:
    wherein the docking station additionally includes a port for an input/output bus interface; and
    wherein the second translation manager additionally includes a bus generator which generates control and data signals for the input/output bus interface.

8. A portable computing system as in claim 7 additionally comprising:
    an optical cable for connecting the docking station to the portable computer.

9. A portable computing system as in claim 7 wherein the docking station additionally comprises a flat pad on which is placed the portable computer.

10. A portable computing system as in claim 9 wherein the flat pad includes an infrared transceiver.

11. A portable computing system as in claim 10 wherein the flat pad additionally includes a low profile inductor used to provide power to the portable computer.

12. A portable computing system as in claim 9 wherein the flat pad is built into a work surface.

13. A portable computing system as in claim 9 wherein the docking station additionally comprises an alarm means for detecting when the portable computer has been removed from the flat pad without authorization.

14. A portable computing system as in claim 4 wherein the docking station additionally includes:
    a window on a first side of the docking station; and,
    a reflective surface behind the window;
    wherein the wireless transceiver transmits and receives infrared signals which travel through the window and are reflected by the reflective surface.

15. A docking station for a portable computer comprising:
    a wireless transceiver for wireless communication with the portable computer;
    a plurality of ports, each port including a physical connector; and,
    a translation manager, coupled between the wireless transceiver and the plurality of ports, for managing translation of information transferred between the wireless transceiver and the plurality of ports, wherein the translation provided by the translation manager allows the plurality of ports to fully function as ports of the portable computer while using only the wireless transceiver for data communication between the docking station and the portable computer.

16. A docking station as in claim 15 wherein the wireless transceiver transmits and receives infrared signals.

17. A docking station as in claim 15 wherein the translation manager includes:
    a protocol manager coupled to the wireless transceiver, the protocol manager extracting data intended for the plurality of ports from wireless communication received by the wireless transceiver; and,
    a port generator coupled to the plurality of ports and to the protocol manager, the port generator generating control and data signals for the plurality of ports from the data extracted by the protocol manager.

18. A docking station as in claim 17,
    wherein the docking station additionally includes a port for an input/output bus interface, and wherein the translation manager additionally includes a bus generator which generates control and data signals for the input/output bus interface.

19. A docking station as in claim 15 additionally comprising:

an optical cable for connecting the docking station to the portable computer.

20. A docking station as in claim 15 additionally comprising a flat pad on which is placed the portable computer.

21. A docking station as in claim 20 wherein the flat pad includes an infrared transceiver.

22. A docking station as in claim 21 wherein the flat pad additionally includes a low profile inductor used to provide power to the portable computer.

23. A docking station as in claim 20 wherein the flat pad is built into a work surface.

24. A docking station as in claim 15 additionally comprising:

a window on a first side of the docking station; and, a reflective surface behind the window;

wherein the wireless transceiver transmits and receives infrared signals which travel through the window and are reflected by the reflective surface.

25. A docking station as in claim 24 wherein the window extends beyond the portable computer allowing the wireless transceiver to communicate with a device in addition to the portable computer even when the portable computer is docked to the docking station.

26. A docking station as in claim 24 wherein wireless transceiver includes means for communicating with a device in addition to the portable computer even when the portable computer is docked to the docking station.

27. A method for communicating between a portable computer and a docking station comprising the following steps:

(a) transmitting information without wires from the portable computer to the docking station; and, (b) generating, by the docking station from the information transmitted in step (a), control signals and data signals for a plurality of ports, wherein the control signals and the data signals generated by the docking station allows the plurality of ports to fully function as ports of the portable computer.

28. A method as in claim 27, additionally including the following steps performed before step (a):

(c) generating, by software processes executing on the portable computer, data for a plurality of virtual ports; and, (d) combining the data generated in step (c) to produce the information transmitted in step (a).

29. A method as in claim 27 wherein step (a) includes transmitting the infrared signals using a transmission of infrared signals.

30. A method as in claim 27 wherein step (b) includes generating, by the docking station from the information transmitted in step (a), control signals and data signals for an input/output bus.

31. A method as in claim 27, additionally including the following steps:

(c) transmitting information without wires from the docking station to the portable computer; and, (d) generating, by the portable computer from the information transmitted in step (c), data to be forwarded to software processes executing on the portable computer.

* * * * *